United States Patent [19]
Goor

[11] Patent Number: 5,335,745
[45] Date of Patent: Aug. 9, 1994

[54] ENGINE MOUNTING SYSTEM

[75] Inventor: Dan Goor, Colorado Springs, Colo.

[73] Assignee: Goor Associates, Inc., Colorado Springs, Colo.

[21] Appl. No.: 934,964

[22] Filed: Aug. 25, 1992

Related U.S. Application Data

[63] Continuation-in-part of Ser. No. 832,365, Feb. 7, 1992, Pat. No. 5,213,179, which is a continuation-in-part of Ser. No. 727,891, Jul. 10, 1991, Pat. No. 5,178,230, which is a continuation-in-part of Ser. No. 630,172, Dec. 19, 1990, Pat. No. 5,076,389.

[51] Int. Cl.$^5$ .................... B60K 5/00; B62D 21/15
[52] U.S. Cl. .................... 180/232; 280/784; 248/637
[58] Field of Search ............ 180/232, 312, 298, 299, 180/300, 902; 280/784; 248/635, 637, 659

[56] References Cited

U.S. PATENT DOCUMENTS

| | | | |
|---|---|---|---|
| 1,970,156 | 2/1932 | Wanner | 248/659 |
| 1,991,579 | 2/1935 | Sampson | 180/300 |
| 3,638,748 | 2/1972 | Tixier | 180/64 R |
| 3,718,304 | 2/1973 | Schulz et al. | 248/9 |
| 3,752,247 | 8/1973 | Schwenk | 180/232 |
| 3,774,712 | 11/1973 | Froumajou | 180/232 |
| 3,815,703 | 6/1974 | De Lorean et al. | 180/91 |
| 3,851,722 | 12/1974 | Grosseau | 180/82 R |
| 3,860,258 | 1/1975 | Feustel et al. | 280/106 R |
| 3,869,017 | 3/1975 | Feustel et al. | 180/82 R |
| 3,896,739 | 7/1975 | Crofts | 105/133 |
| 4,031,978 | 6/1977 | Taylor | 180/91 |
| 4,067,524 | 1/1978 | Brinkmann | 248/9 |
| 4,073,357 | 2/1978 | Danckert | 180/64 R |
| 4,091,888 | 5/1978 | Yamanaka et al. | 180/82 R |
| 4,181,192 | 1/1980 | Danckert | 180/232 |
| 4,238,104 | 12/1980 | Hamilton | 248/566 |
| 4,822,010 | 4/1989 | Thorn | 267/140.1 |
| 4,919,474 | 4/1990 | Adachi et al. | 296/194 |

FOREIGN PATENT DOCUMENTS

| | | | |
|---|---|---|---|
| 0202524 | 8/1989 | Japan | 180/232 |
| 0202525 | 8/1989 | Japan | 180/232 |
| 1489360 | 10/1977 | United Kingdom | 180/232 |

*Primary Examiner*—Margaret A. Focarino
*Assistant Examiner*—Paul Dickson
*Attorney, Agent, or Firm*—Weingarten, Schurgin, Gagnebin & Hayes

[57] ABSTRACT

An exemplary engine mounting system provides two sets of rails along which the engine can travel in the event of an impact. A first set of rails is longitudinally mounted within the vehicle with the inwardmost portions thereof curving towards the ground to prevent intrusion by the engine into the passenger compartment. A second set of rails, orthogonal to the first set, permits side-to-side movement of the engine and first set of rails. The second set of rails may be curved downward to lengthen the path of engine travel. Springs are used for biasing against both longitudinal and transverse movement, as well as for dampening of engine vibration. The two sets of rails may be used in conjunction with bumpers attached directly to the engine. In another embodiment the engine block is mated with lugs to an engine mount integrated with the vehicle frame via angled shock absorbing pistons. The lugs move within a track permitting lateral engine movement and the angled pistons direct the engine underneath the passenger compartment.

In an embodiment for a transverse mounted engine, the engine is hinge mounted to a support plate that is mated to tracks in a support wall that is slidably disposed on downwardly angled engine support bars. The system encourages a complex motion having downward, rearward and rotational components to direct the engine away from the passenger compartment.

15 Claims, 8 Drawing Sheets

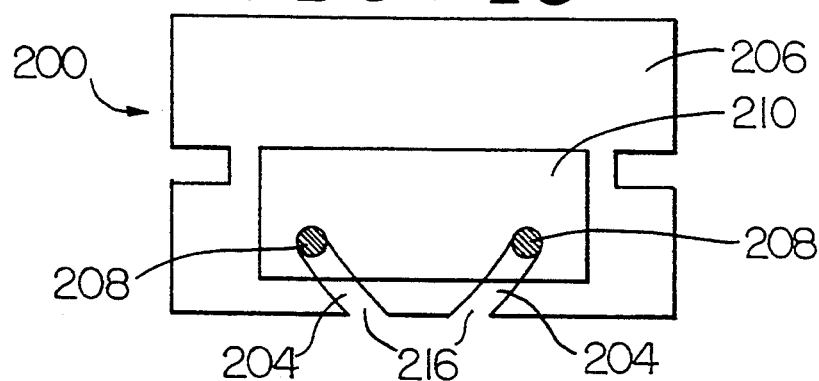
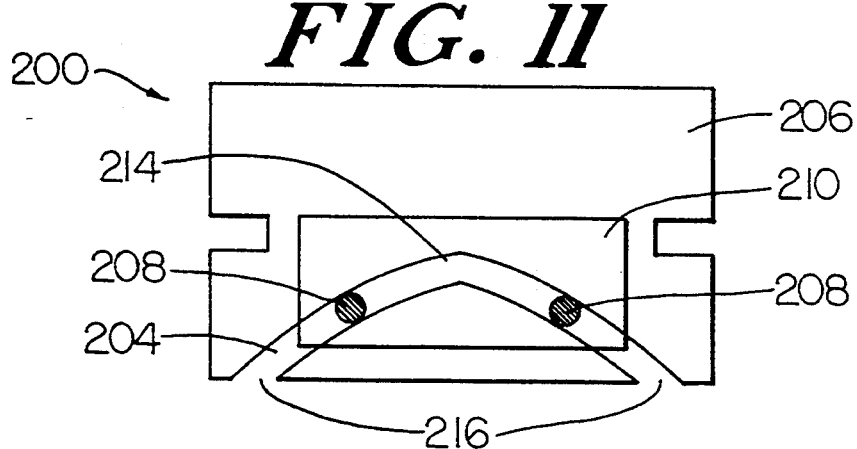
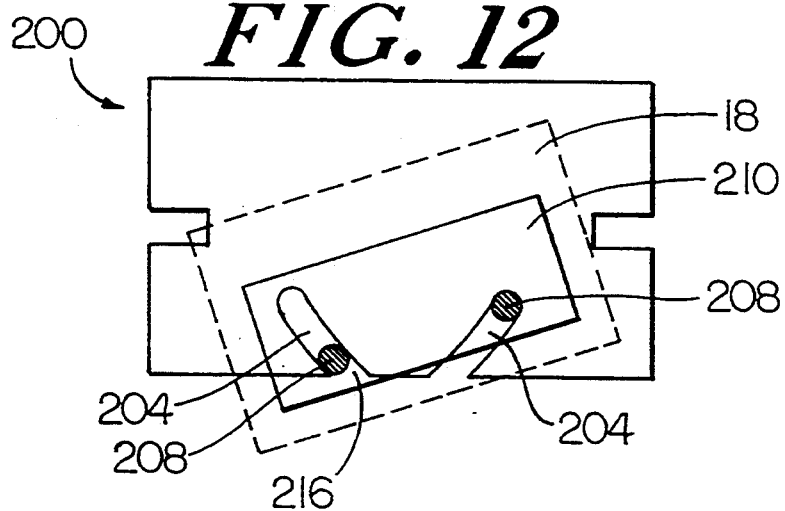

ENGINE MOUNTING SYSTEM

RELATED INVENTIONS

This is a continuation-in-part application under 37 C.F.R. |1.60 of U.S. patent application Ser. No. 07/832,365, filed Feb. 7, 1989, now U.S. Pat. No. 5,213,179 which is a continuation-in-part of U.S. patent application Ser. No. 07/727,891 filed on Jul. 10, 1991, now U.S. Pat. No. 5,178,230 which is a continuation-in-part application under 37 C.F.R. |1.60 of U.S. Pat. No. 5,076,389 which issued on Dec. 31, 1991.

FIELD OF THE INVENTION

The invention relates to the end body structure of motor vehicles, and more particularly to the mounting of engines.

BACKGROUND OF THE INVENTION

Automobile frame and body designs have taken into account the need for absorbing the impact of frontal collisions. To this end, U.S. Pat. No. 3,869,017 provides an example of an impact absorbing system for a motor vehicle containing both a plastically deformable energy absorbing frame section and break-away engine mounts which fracture in the event of a catastrophic collision and permit the engine to separate from the frame. Once the engine is separated, according to this design, the frame sections need support only the inertia load of the vehicle body. However, the design does not prevent the engine from invading the passenger compartment, where it can cause injuries to occupants.

In similar fashion, U.S. Pat. Nos. 3,718,304; 3,851,772; 4,073,357; and 4,181,192 disclose energy absorbing chassis members having severable engine mounts which allow the engine blocks to be severed from the frame in the event of a substantial impact or when a critical deceleration rate is reached. However, the releasable mounts disclosed therein do not necessarily work in cooperation with each other, so that in offset frontal impacts the engine may be only incompletely released from the frame. There is no teaching, furthermore, as to how dislocation of the engine block is controlled.

An energy absorbing motor mount assembly is disclosed in U.S. Pat. No. 4,238,104 wherein a pair of mounting elements are attached to arms that extend downward into containment housings with resilient springs for forward and backward movement. Presumably, energy absorption is provided in fore and aft directions, but the assembly does not provide for, and in fact teaches against, the decoupling of the engine from the mounts in substantial impacts.

U.S. Pat. No. 3,638,748 discloses a chassis-frame structure having upper and lower sets of longitudinal members. A transverse cross-member which connects one of the sets of longitudinal members forces an engine block to be pivoted into the ground. The longitudinal members also flex and buckle into the ground so that the vehicle front end is raised accordingly. The movement of the engine block is substantially limited, such that the moment of inertia of the engine is not sufficiently isolated from the vehicle as a whole.

U.S. Pat. No. 4,238,104 discloses a motor mount assembly in which a mounting element, such as an arm having an enlarged head portion, is mounted for reciprocation in fore and aft directions against biasing springs inside a containment housing. The arm also permits side-to-side motion of the mounted engine. The freedom of motion permitted by this assembly, however, is limited. In a frontal collision of substantial impact the engine block must be sheared from the mounts to substantially disengage its moment of inertia from the vehicle frame.

In view of the foregoing disadvantages, an engine block mount is needed for decoupling the inertial body of the engine from the vehicle frame while controlling its position relative to the frame during substantial impacts.

SUMMARY OF THE INVENTION

In surmounting the foregoing disadvantages, the present invention provides an engine block mount assembly comprising a set of longitudinally arranged rails having outwardly and inwardly biased springs for permitting movement of the engine during impact. The inward ends of the rails are curved downwards so that in an impact of substantial force the engine is directed inward and toward the ground to prevent invasion of the passenger compartment by the engine block. The engine block is mounted on or to the rails by bearings which provide dampening of engine vibration and permit movement of the engine along the rails.

Unlike engine mountings of the prior art, the teaching of the present invention includes consideration of the relative positions of the engine block and automobile frame at different stages of impact: (1) when the engine moves forward (i.e., outward from the passenger compartment) while the nose of the vehicle begins to collapse; (2) when the engine meets the object into which the automobile has collided; and (3) when the engine rebounds rearward (towards the passenger compartment) after imparting its momentum into the colliding object. During each of these stages, the inertia load of the engine block is decoupled from the frame; yet the weight of the engine block is used advantageously to counter the momentum, if any, from the colliding object. As more of the frame collapses, the engine block is directed downward away from the passenger compartment by virtue of the downward paths-of-least-resistance provided for the movement of the engine block. In another embodiment of the invention, pivots are used near the front of the engine block instead of bearings. However, the same purpose of directing the engine downwards on tracks using bearings located near the inward portion of the engine block is achieved, and this provides the engine with a path of less resistance than would not otherwise be available if the engine block were to be fixed by conventional mounts to the automobile frame.

An exemplary embodiment of the invention further comprises a second set of rails disposed in a generally orthogonal direction to the longitudinal rails to permit side-to-side movement of the engine block. The second set of rails may be curved downward to increase the travel path of the engine.

In a further exemplary embodiment, the rail system of the invention is used in conjunction with a bumper system mounted by shock absorbers to the engine block.

In another exemplary embodiment, the engine block is coupled by lugs to an engine mount integrated with the vehicle frame via angled shock absorbing pistons. The lugs on the engine block are slidably disposed in a track permitting lateral engine movement while the angled pistons absorb energy from a frontal impact and direct the engine underneath the passenger compartment.

In yet another embodiment, the engine block for a transverse mounted engine is hinge mounted to a support plate that has lugs slidably disposed in one or more tracks on a support wall. The lug and track arrangement redirects energy imparted to the engine during a lateral impact by encouraging the engine to rotate or follow a path-of-least-resistance. The support wall is removably coupled to engine support bars which guide the engine, that swings toward the ground on the hinge, underneath the passenger compartment during a frontal collision.

Thus, the present invention provides the ability to decouple the inertia of engine mass from the frame while retaining control over the movement of the engine block. The invention provides passenger safety even in offset frontal collisions which would otherwise thwart the purposes of designs which employed releasable, shearable, or slidable mounts that do not work cooperatively with other mounts to absorb the energy of collision.

DESCRIPTION OF THE DRAWINGS

A more complete understanding of the present invention and attendant advantages and features thereof will be more readily understood by reference to the following detailed description when considered in conjunction with the accompanying drawings wherein:

FIG. 10 is a front view of the engine mounting assembly of FIG. 9, depicting a dual track configuration for the support plate and support wall interface;

FIG. 11 is a front view of the an invention of FIG. 9, with a single arcuate track replacing the dual tracks of FIG. 10;

FIG. 12 is a front view of the engine mounting system of FIG. 9, depicting controlled engine displacement in response to the lateral component of a severe crash;

DETAILED DESCRIPTION OF THE INVENTION

Figure 1:
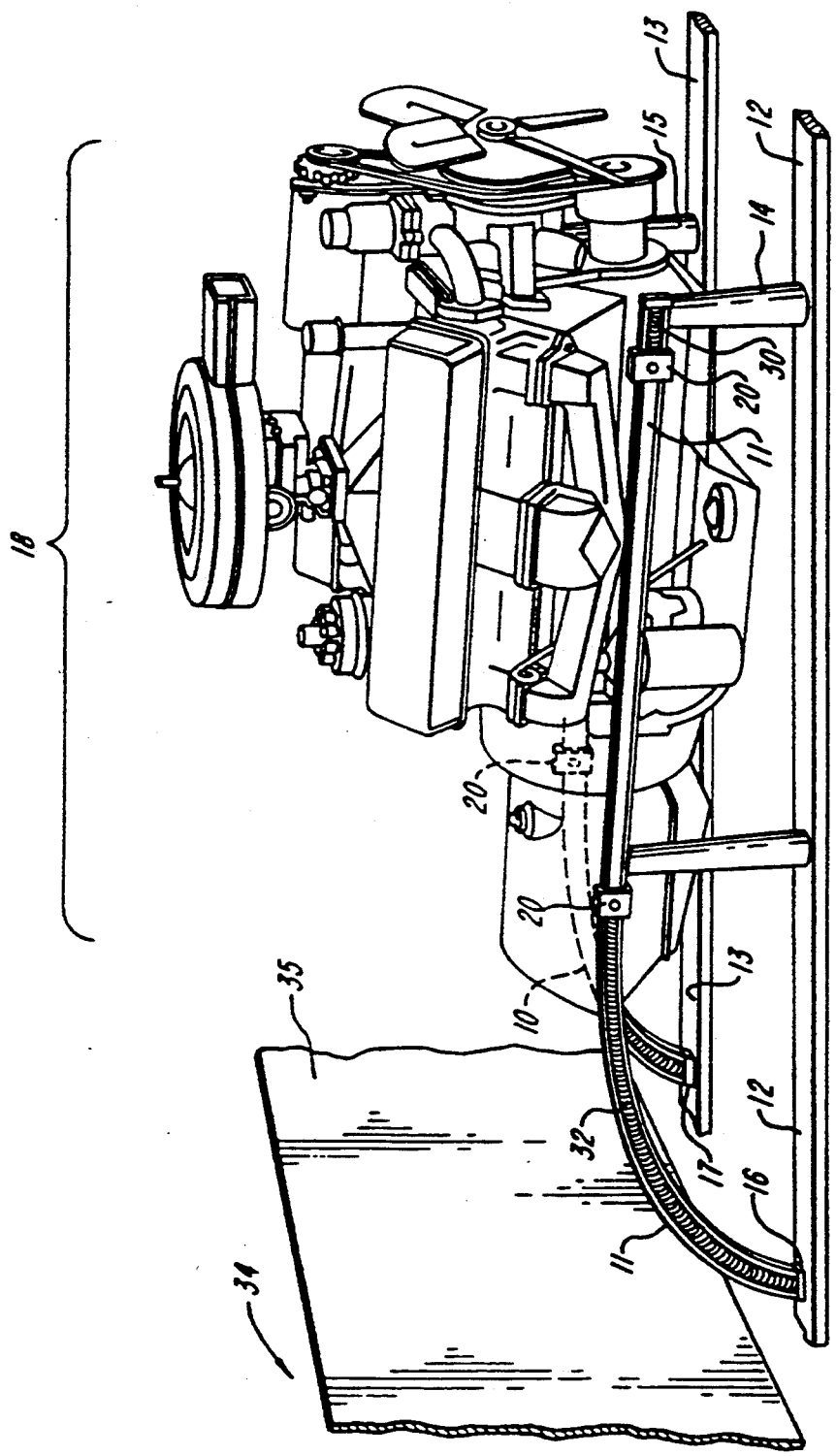
FIG. 1 is a diagrammatic side view of an engine block mount system of the present invention on an automobile frame.

FIG. 1 illustrates an exemplary embodiment of the engine block mount of the present invention. The engine block mount assembly comprises a set of rails 10 and 11 longitudinally arranged with respect to the automobile frame designated generally at 12 and 13. The front ends of the rails 10 and 11 are connected to automobile frame members 12 and 13 by means of connecting members 14 and 15, and the rear ends of the rails 10 and 11 are connected to the frame members 12 and 13 at points designated 16 and 17. As a variety of automobile frame shapes is possible, it is to be understood that connection of rails 10 and 11 to frame members 12 and 13, or to a unitary frame, may be accomplished by means known in the art, so long as the rearward portion of the rails is directed towards the ground to permit an engine block 18 mounted thereon to avoid the passenger compartment 34 of the vehicle.

The engine block 18 is mounted to the rails 10 and 11 by a set of bearings, 20, which permit the engine block 18 to move forward and rearward along the rails 10 and 11. A biasing means, such as springs 30, may be placed within the rails to exert a biasing force to resist the forward, or outward, movement of the engine block 18 along the rails 10 and 11. Springs 32 may similarly be placed in the aft ends of the rails 10 and 11 to exert a forward biasing force to resist the rearward, or inward, movement of the engine block 18 along the rails. The biasing springs 30 and 32 are selected and adjusted to permit movement of the bearing-mounted engine block only when a certain force is level reached, such as in substantial frontal collisions.

During the initial phase of a collision having substantial force of impact, the foremost portions of the automobile frame 12 and 13 begin to collapse, and the engine block 18 moves forward along the rails 10 and 11 while being resisted by the rearward-biased springs 30. During impact between the engine block 18 and the object (not shown) into which the automobile collides, the momentum of the engine block 18 is transferred into the object to counter the momentum, if any, of the object; and thereafter the engine block moves rearward along the rails 10 and 11 against the forward-biased springs 32 and towards the ground along the downwardly-directed rear ends of the rails located near the frame at 16 and 17. Thus, once the engine block 18 has absorbed most of the frontal impact, the rails direct the absorbed energy of the impact towards the ground and away from the passenger compartment 34 located behind the firewall 35.

Figure 2A:
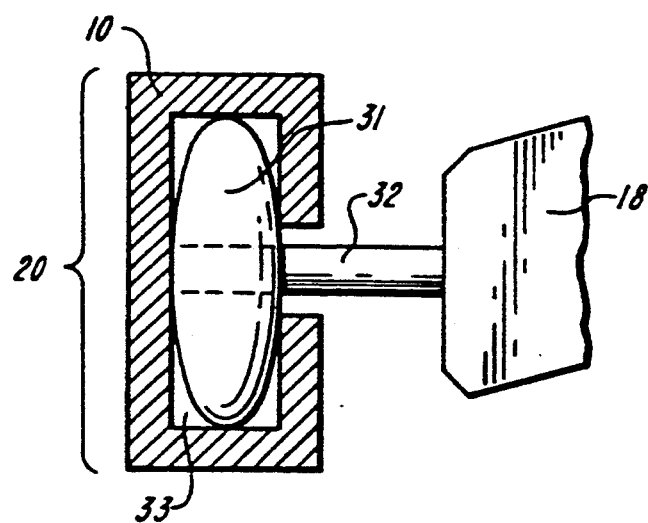
FIG. 2A is a cross-sectional view of a rail and bearing of an engine block mount system according to the invention.
Figure 2B:
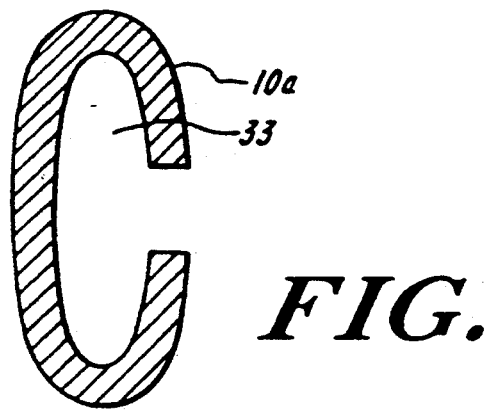
FIG. 2B is a cross-sectional view of an oval-shaped rail employed in the invention.

FIG. 2A shows an embodiment of the invention is which a bearing 31 connected by a connecting member 32 to the engine block 18 travels within a channel 33 defined by a rail shown at 10. The cross-sectional shape of the rail 10 may be any form so as to house a channel for the bearings 20, and may assume a circular or oval shape which is bent out of one piece of metal, as shown generally at 10A in FIG. 2B. The bearing 20 may be rotatably mounted on the connecting member 32, or fixed on the elongated member 32 so as to slide within the rail channel 33 as shown in FIG. 2A.

Figure 3:
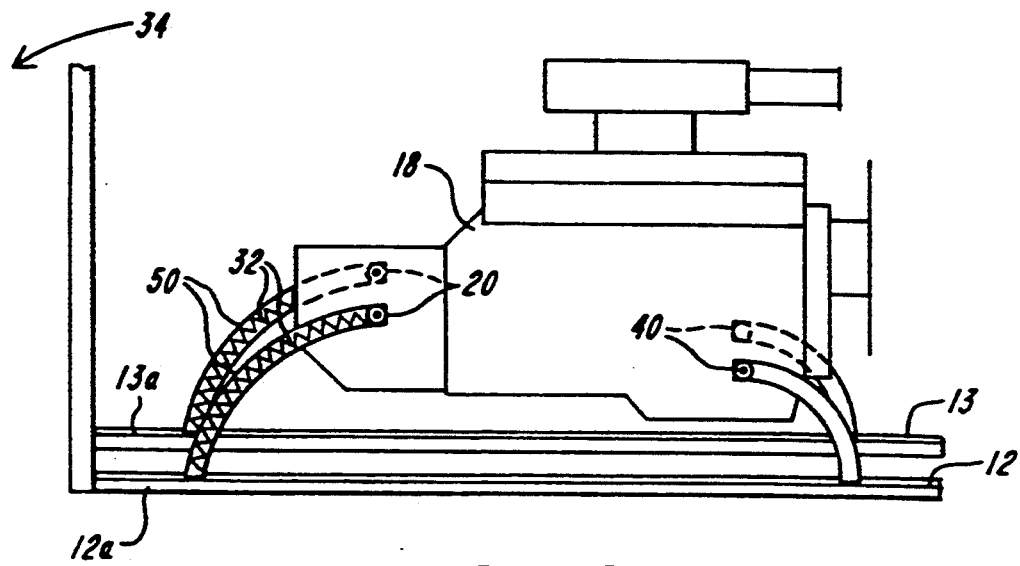
FIG. 3 is a diagrammatic side view of an engine block mount system of the present invention on an automobile frame with front pivots.

FIG. 3 shows another embodiment of the invention in which pivots 40 located on either side of the engine block 18 near the front of the engine are connected to the automobile frame portions 12 and 13 at a point relatively low to the ground. The rear of the engine block 18 has bearings 20 attached on either side of the engine block 18 and movably attached to a pair of rails 50 which direct the engine 18 downwards upon a substantial impact which crumples the frame at portions designated generally 12a and 13a. The invasion of the passenger compartment 34 by the engine block 18 is thereby avoided.

Damping material such as rubber or other material may be packed between the bearings 20 and springs 30 and 32, or within the springs, so as to contribute to the ability of the engine block system to absorb engine vibration.

Figure 4:
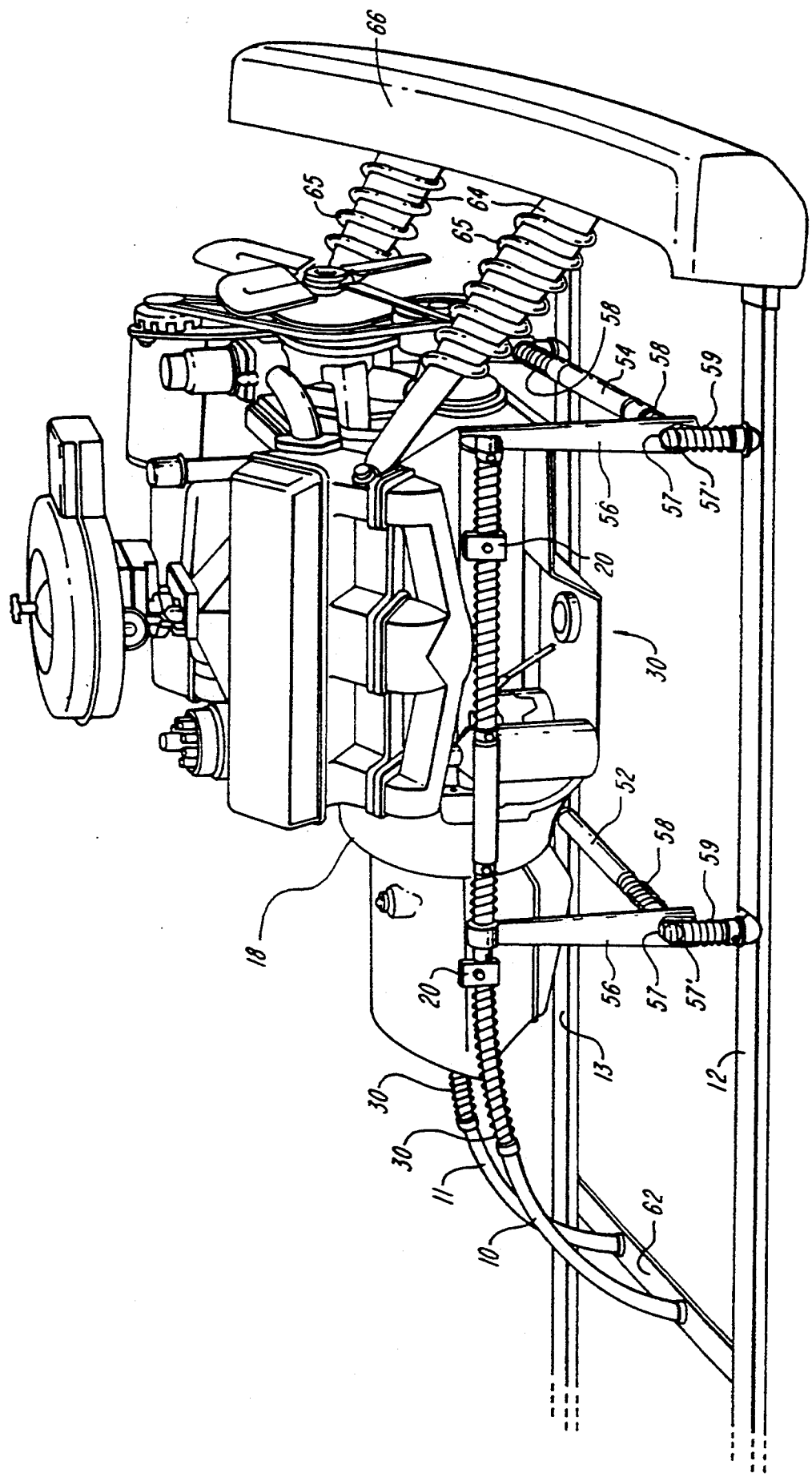
FIG. 4 is a diagrammatic view of an exemplary embodiment of an engine mounting system comprising two sets of rails.

FIG. 4 is an exemplary embodiment of an engine mount system comprising a first set of rails 10 and 11 which are longitudinally disposed with respect to the vehicle frame 12 and 13, and a second set of transverse rails 52 and 54 which are orthogonally disposed with respect to the first set 10/11. The longitudinal rails 10 and 11 are preferably not directly attached to the vehicle frame 12 and 13, or they may be detachable from the vehicle frame in the event of a collision. The longitudinal rails may also be attached to a member 62 that is detachable from the frame 12/13. Springs 30 are disposed inwardly and outwardly of the bearings 20 connected to the engine 18 to exert a biasing force to resist, respectively, the inward and outward movement of the engine along the rails 10 and 11. The inward portions of the rails 10 and 11 are curved downward to direct the travel of the engine towards the ground in the event of a substantial collision. The second set of rails 52 and 54 provides damping and a degree of freedom from the lateral inertial moment of the engine 18 during collisions and sudden lateral vehicle movement. The longitudinal rails 10 and 11 and transverse rails 52 and 54 may be connected together by vertical structural members 56. The top of the vertical members 56 are welded, bolted, or otherwise attached to the longitudinal rails 10 and 11. The vertical members are movably mounted with respect to the transverse rails 52 and 54.

In an exemplary embodiment of the invention, the vertical connecting members 56 contain holes or openings 57 operative to permit slidable mounting upon and movement along the transverse members 52 and 54. Bearings located in the holes 57 provide for slidable engagement along the transverse rails 52 and 54. The transverse rails 52 and 54 each comprise springs 58 for biasing the connecting members 56 in one lateral direction and springs 59 for biasing them in the other lateral direction. The outward ends of the transverse members 52 and 54 may be curved downward or upward at the point at which the members 52 and 54 are attached to the vehicle frame 12/13, such that the force of an impact or sudden lateral movement is redirected or sustained by a longer travel path.

FIG. 4 also illustrates a further exemplary embodiment of the invention wherein the engine mounting system of the invention is used in conjunction with a bumper system. One or more shock absorbers 64 are connected to the bumper 66 and engine block 18. Such a configuration allows the impact of a collision to be absorbed directly by the engine block 18. Springs 65 on the shock absorbers 66 also help to absorb the impact. Costly damage to the vehicle frame or chassis is thereby minimized.

Figure 5:
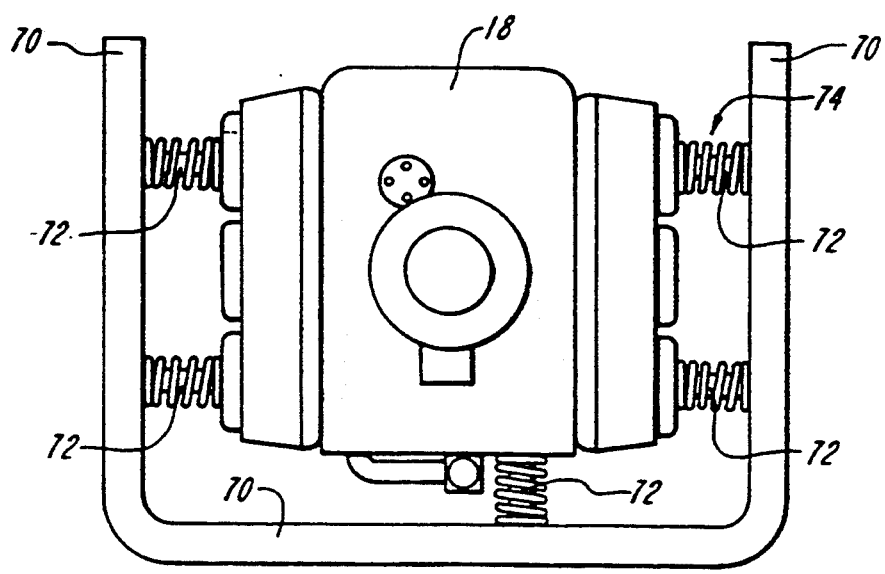
FIG. 5 is a top illustrative view of an exemplary engine extension bumper system used in conjunction with the engine mount system of the invention.

FIG. 5 is a top illustrative view of an extension bumper or bracket 70 which is attached by one or more shock absorbers 72 to the engine block 18. This extension bracket 70 is used in conjunction with the first set 10/11 and second set 52/54 of rails described above to provide further ability to absorb the momentum of substantial collisions and impacts. The bracket 70 has a substantially curved or U-shape so that the side impacts may be transmitted to the engine 18 through shock absorbers 72. The shock absorbers 72 may further be complemented by springs 74. The extension bracket 70 is preferably sized to fit within the engine compartment of the vehicle.

Figure 6:
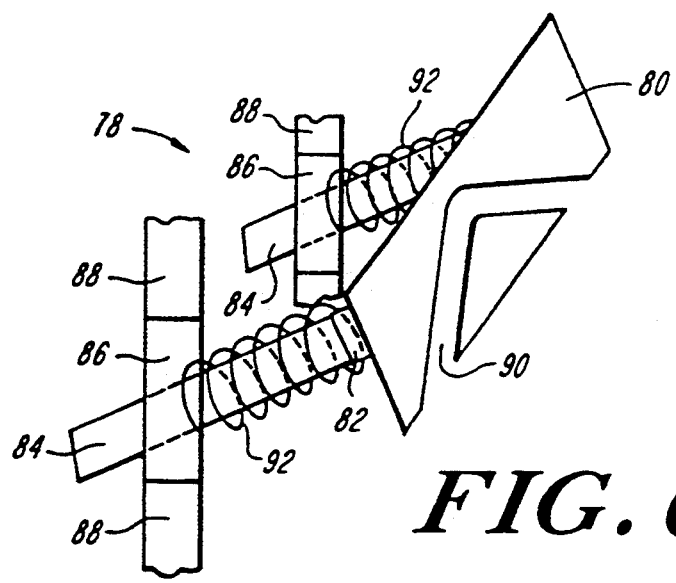
FIG. 6 is a perspective view of an exemplary embodiment of an engine mounting system having angled pistons coupled to an engine block mount incorporating a track.

FIG. 6 is an exemplary embodiment of an engine mounting system 78 capable of complex motion, which is especially effective in altering the relative motion of the engine block 18 with respect to the passenger compartment 34 during a pure frontal or an oblique frontal catastrophic impact. An engine mounting bracket 80, for mating with an engine block 18, is shown coupled via movable joints 82 to pistons 84. The pistons 84 pass through shear fittings 86 in chassis members 88 at a predetermined angle.

Figure 7:
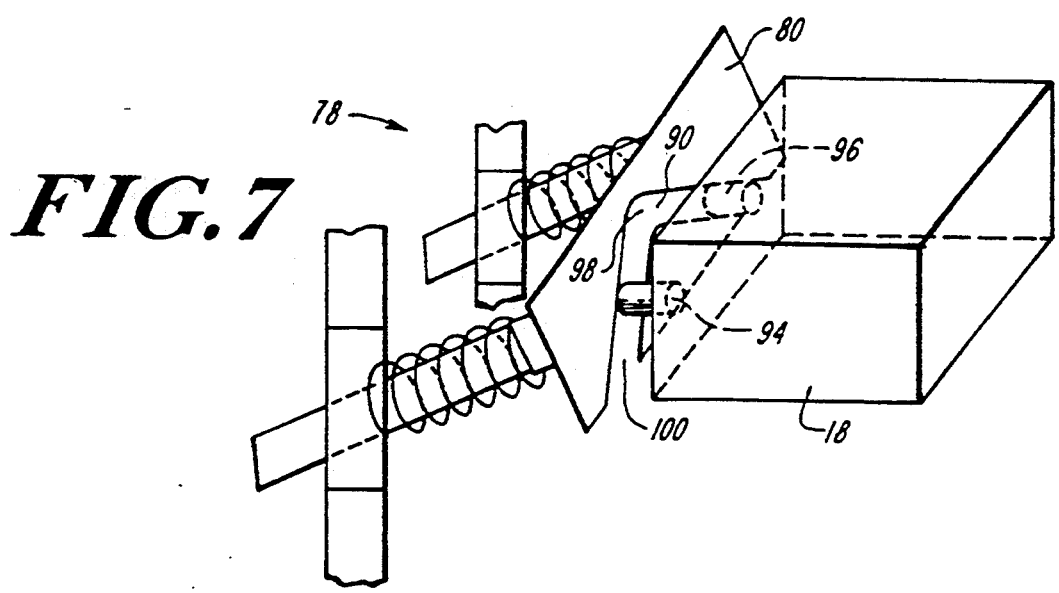
FIG. 7 is a perspective view of the engine mounting system of FIG. 6 depicting the engine installed.
Figure 8:
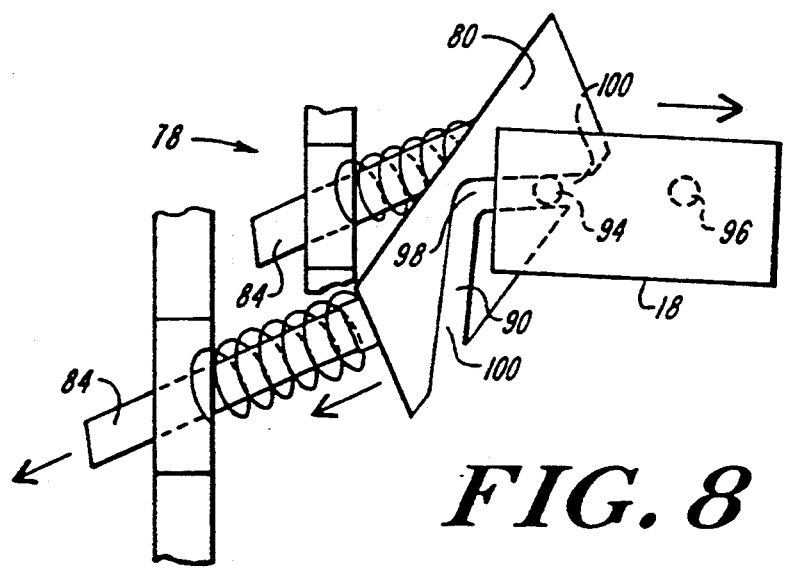
FIG. 8 is a perspective view of the engine mounting system of FIG. 6 depicting controlled engine displacement during catastrophic impact.

The engine mounting bracket 80 incorporates a groove or track 90 open at either end, which will be further discussed with respect to FIGS. 7 and 8. The joints 82 connecting the bracket 80 to pistons 84 allow for only very limited motion, on the order of approximately fifteen degrees off center, and prevent premature or uncontrolled shearing of the joints 82, bracket 80 or pistons 84 before the controlled motion sequence created by the system 78 begins. The joints 82, however, may be entirely omitted or designed to have a higher degree of freedom without departing form the inventive concept of the system 78.

The pistons 84 are shown surrounded by conventional helical springs 92, having a specific compressibility based upon the weight of the engine block 18, for absorption of impact forces and control of piston travel. The ease of piston travel is regulable through a friction device in the shear fitting 86 in order that resistance may be constant, incrementally increased or incrementally decreased. Variable resistance may also be achieved using other spring configurations. Alternatively, the springs 92 and pistons 84 may be replaced by charged gas or hydraulic shock absorbers.

The pistons 84 pass though shear fittings 86 in the chassis members 88 at a predetermined angle. The specific angle is determined in relation to the particular vehicle into which the system 78 is incorporated as a function of engine weight, engine compartment size and shape, firewall and frame structure, and location of the passenger compartment. The angled pistons 84 move downward when the bracket 80 is pushed towards the chassis members 88. As the pistons 84 descend so does the bracket 80, such that when the bracket 80 makes contact with the chassis members 88, the bracket 80 and the engine block 18 mounted thereon are lower than they were in the noncompressed state.

Moving the engine block 18 downward using the engine mounting system 78 as described accomplishes several things. Initially, the springs 92 and pistons 84 absorb a portion of the frontal impact energy through compression of the springs 92 and friction between the pistons 84 and the friction devices in the shear fittings 86. Next, as the pistons 84 are compressed and the engine block descends, the trajectory of the engine block 18, or relative motion with respect to the passenger compartment 34, is altered downward away from the passenger compartment 34. When the pistons 84 are fully compressed with respect to the chassis members 88, the shear fittings 86 decouple from the chassis members 88 to allow the engine block 18 to continue its travel downward and away from the passenger compartment 34.

The preceding discussion describes the functioning of the pistons 84 in a frontal impact situation, and the system 78 need not comprise additional features to derive advantages similar to those previously described with respect to FIG. 1. Limitation of the system 78 in this manner obviates the particular bracket 80 design, as almost any means of connecting the engine block 18 to the pistons 84 will suffice. However, to derive the complete safety advantages of the system 78, in lateral or oblique impacts, the specially designed engine mounting bracket 80 must be used.

FIG. 7 depicts an embodiment of the bracket 80 presented in FIG. 6, the engine block 18 mounted thereon with lugs 94/96 in a track 90. The track 90 approximates two sides of a triangle with a rounded apex 98. A continuous curve is also a desirable shape for the track 90, as are multiple tracks with multiple lugs for increased support of the engine block 18. The lugs 94/96 may be an integral part of the engine block 18, part of a bolted or welded on fixture, or part of an entire engine bracket or cage. The lugs 94/96 are slidably disposed in the track 94 which has an opening 100 at each bottom corner of the bracket 80. The purpose of the openings 100 is to permit the lugs 94/96 to disengage from the bracket 80, therefore the exact placement of the openings 100 may vary along with their size and shape.

With respect to FIG. 8, the functioning of the bracket 80 having lugs 94/96 and track 90 is better understood. Upon lateral impact, one side of the engine block 18 is forced to rise and the other to fall as lug 94 moves within the track 90 towards the apex 98 and lug 96 moves within the track 90 towards the opening 100. When lug 94 reaches the apex 98 it too starts to move towards the opening 100. At this point the motion of the engine block 18 is directed downward and a portion impact energy has been dissipated during the rotational and translational movement. While the bracket 80 works extremely well with the piston 84 assembly, it may also be used independently from it.

During an oblique or off centerline axis impact, the angled pistons 84 and the bracket 80 having a track 90 and lugs 94/96, each function independently but synergistically to redirect or to provide a path-of-least-resistance for the engine block 18. Either alone, or combined with impact absorbing bumpers and crumple zones known in the art, this system 78 reduces the impact energy transmitted from the engine block 18 to the passenger compartment 34, and eliminates engine block 18 intrusion into the passenger compartment 34 by redirecting the engine block 18 beneath it.

Figure 9:
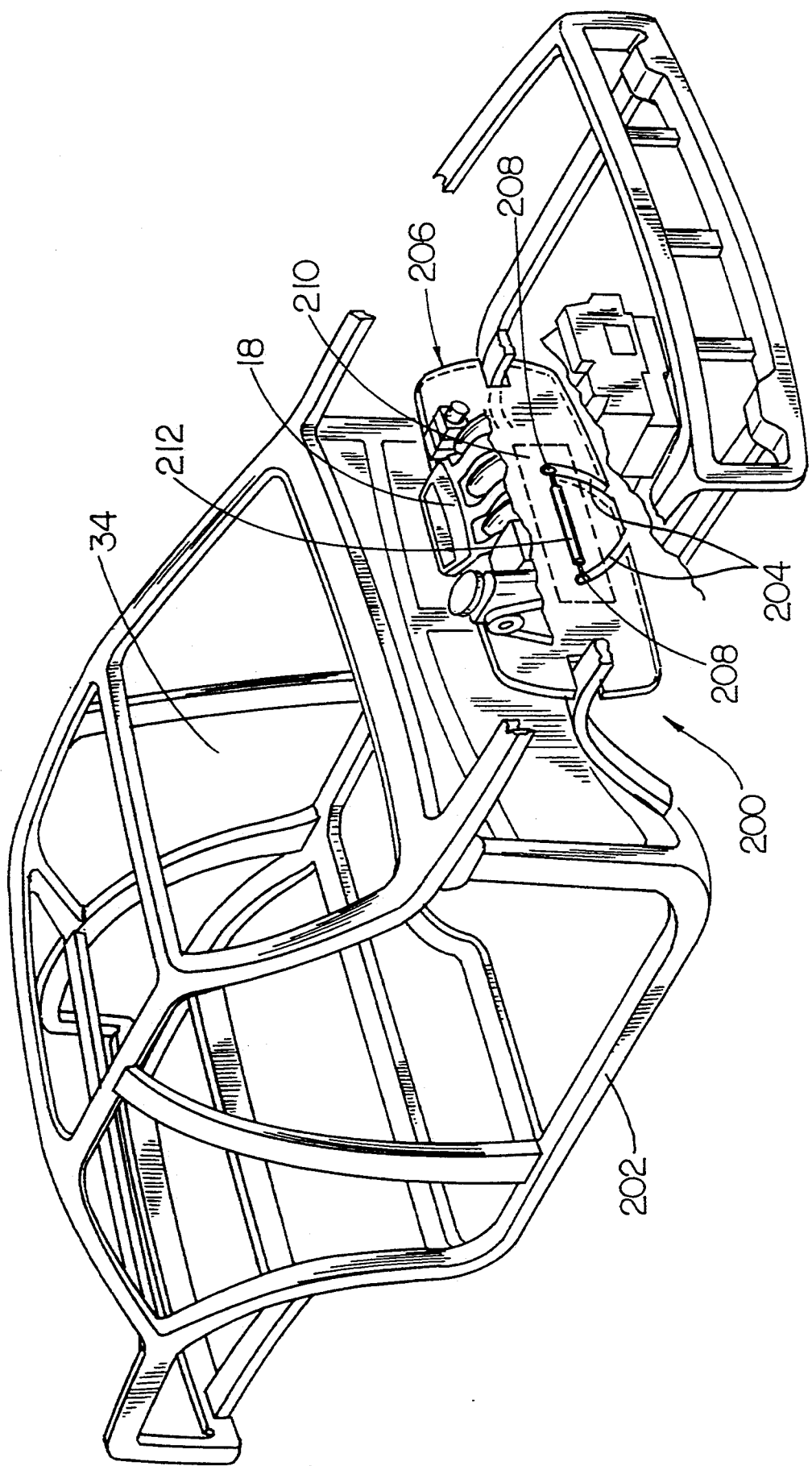
FIG. 9 is a perspective view of an automobile chassis incorporating an engine block mount system of the present invention adapted for a transverse mounted engine.

While the engine mounting system 78 may be adapted for use with a transversely mounted engine, FIG. 9 depicts a transverse engine mounting system 200, incorporated within a vehicle chassis 202, that is specifically configured for the task. Like the engine mounting system 78, the transverse engine mounting system 200 is capable of complex motion for dissipating the energy imparted to an engine block 18 after a severe frontal, lateral, or oblique impact. The large mass of the engine block 18 produces a tremendous amount of kinetic energy which is dissipated in the transverse engine mounting system 200 by encouraging the engine block 18 to follow a path-of least-resistance which lengthens the distance the engine block 18 must travel as it is displaced and increases the time it takes to do so. Thus redirected, the engine block 18 does not invade the passenger compartment 34.

Complex motion of the transverse engine mounting system 200, resulting from longitudinal and lateral impact components of a predetermined magnitude, is produced when the engine block 18 simultaneously: rotates, moves rearward, and moves downward. Rotational motion about an axis parallel to the longitudinal axis of the vehicle chassis 202 is encouraged by providing a path-of-least-resistance such as grooves or tracks 204 in a support wall 206, slidably mated with bolts, wheels, bearings or lugs 208 affixed to a support plate 210 that is mated to the engine block 18. Rotational motion about an axis parallel to the lateral axis of the vehicle is encouraged by using the weight of the engine block 18 in combination with impact forces to hinge or flip the engine block 18 toward the ground with a hinge 212 that connects the engine block 18 to the support plate 210.

FIG. 10 depicts an embodiment of the support wall 206 having two tracks 204 into which the lugs 208 of the support plate 210 are placed. The tracks 204 are canted toward each other so that the lower ends are closer to each other than the upper ends. The upper ends of the tracks 204 are blocked to provide an upper limit of travel for the lugs 208, and the lower ends of the tracks 204 are provided with openings 216 to permit the lugs 208 to disengage from the support wall 206. Under normal vehicle operating conditions, the canted tracks 204 prevent the horizontally aligned lugs 208 from descending past the point in the tracks where the distance between the center of each track 204 corresponds to the distance between the center of each lug 208. Therefore, under normal operating conditions the engine block 18 remains level, with a substantial portion of its weight supported by the lugs 208.

An alternative to the two-track configuration described with respect to FIG. 10, is a single arcuate track configuration as depicted in FIG. 11. The track 204 formed in the support wall 206 describes a gradually curving arc with an apex 214. Openings 216 exist at each end of the arcuate track 204 at or near the bottom edge of the support wall 206 to permit the lugs 208 to exit the arcuate track 204. As with the two-track configuration, under normal operation the lugs 208 are stabilized at a desired height in the arcuate track 204 as a function of the spacing of the lugs in relation to the curvature of the arcuate track 204 and support a substantial amount of the weight of the engine block 18.

Referring to FIG. 12, the transverse engine mounting system 200 is depicted with the engine block 18 (shown in phantom) displaced after a collision from the right side of the vehicle. For an embodiment of the transverse engine mounting system 200 with a two-track configuration, an impact causes the right side of the engine block 18 to descend and the left side to ascend until the left lug 208 is blocked at the end of its track 204. The engine block 18 then rotates about the left lug 208, guided by the track 204, until the right lug 208 exits the bottom of the right track 204 at the opening 216, at which point the engine block 18 tumbles to the ground.

For an embodiment of the transverse engine mounting system 200 incorporating the arcuate track 204 as shown in FIG. 11, the right side lug 208 descends, the left side lug 208 ascends until reaching the apex 214, then it descends and follows the right lug 208 out of the track 204 at which point the engine block 18 tumbles to the ground.

In addition to the rotational motion of the engine block 18 encouraged by lugs 208 and tracks 204 of the two-track and arcuate track configurations, the engine block 18 is also encouraged to rotate about an axis parallel to the lateral axis of the vehicle chassis 202. The weight of the engine block 18, in combination with impact forces, causes the engine block 18 to hinge or flip toward the ground, guided by the hinge 212 that connects the engine block 18 to the support plate 210.

Figure 13:
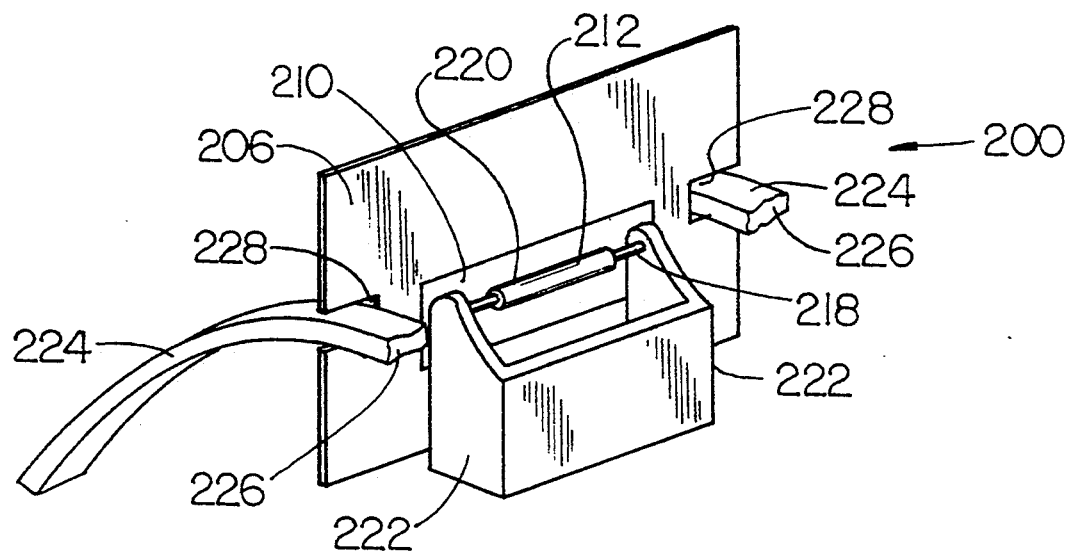
FIG. 13 is a perspective view of the engine mounting system of FIG. 9, depicting one aspect of controlled engine displacement in response to the longitudinal component of a frontal collision.

Referring to FIG. 13, an embodiment of the hinge 212 is shown wherein an axle 218 is housed within an axle guide 220 integrated within or firmly attached to the support plate 210. At each end of the axle 218, an axle coupling 222 secures the engine block 18 to the axle 218. Many other types of hinge arrangements could be effectively used with the invention as long as they are sufficiently strong to support substantially all of the weight of the engine block 18. In FIG. 13, the engine block 18 is shown in its full downward position. When the engine block 18 rotates about the hinge 212 in response to a frontal impact component, it also moves downward and away from the passenger compartment 34.

Rearward and further downward motion of the engine block 18 is encouraged by a slidable connection between the support wall 206 and downwardly curved engine support bars 224, as well as by the downward component imparted by the flipping movement of the engine block 18. The support wall 206 is mounted on engine support bars 224 that have a mounting end 226 in the engine compartment. The mounting ends 226 of the engine support bars 224 are spaced apart an appropriate distance to mate with slots or notches 228 on the right and left sides of the support wall 206. The engine support bars 224 extend downward and rearward from the engine compartment in a gradually divergent manner. The divergence of the lower ends of the engine support bars 224 allows each of the engine notches 228 to disengage from its respective support bar 224 when the inner edges of the support bars 224 are spaced farther apart than the width of the support wall 206 forming the outer edges of the notches 228. In the illustrated embodiment, the support wall 206 remains engaged with the engine support bars 224 until it has moved rearward and is established on a downward trajectory. When the notches 228 allow the support wall 206 to disengage from the engine support bars 224, the engine block 18 then tumbles to the ground. In all of the embodiments, biasing means known to those skilled in the art may be employed to help retain the engine block 18 and support wall 206 in its operating position until predetermined impact forces are sensed.

Figure 14:
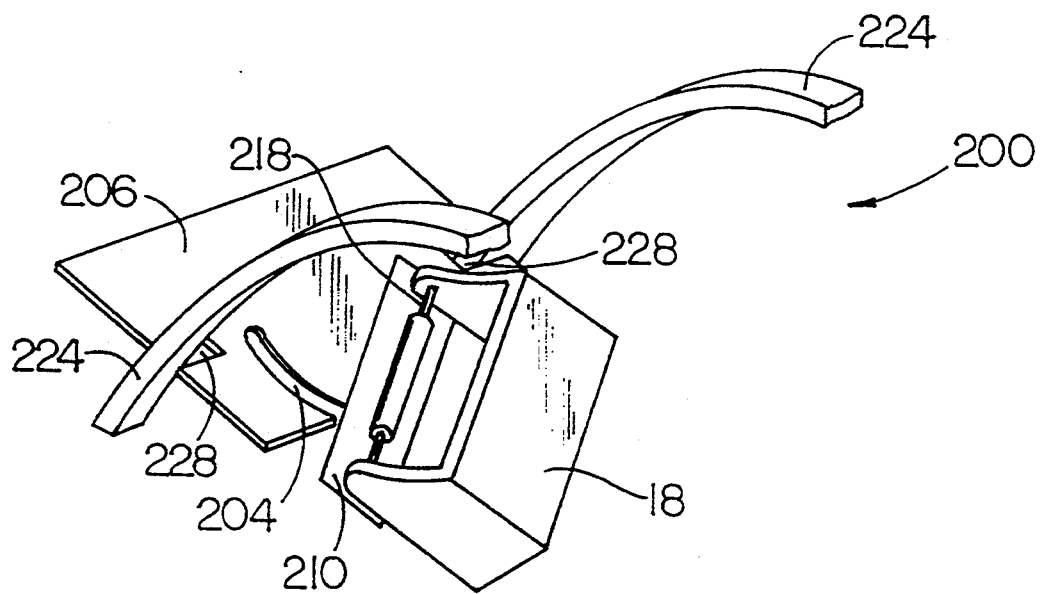
FIG. 14 is a perspective view of the engine mounting system of FIG. 9, further illustrating the complex motion of the engine after a catastrophic oblique impact.

Vehicle accidents rarely are purely frontal or purely lateral. Because the typical accident is a combination of the two, the transverse engine mounting system 200 is designed to encourage motion along multiple axes simultaneously as is depicted in FIG. 14. Upon impact, the engine block 18 has simultaneously: rotated, flipped, translated, and lowered to prevent the engine block 18 from entering the passenger compartment 34.

The transverse engine mounting system 200 may be further adapted for use with a normally aligned or non-transverse engine. In this application, the hinge 212 is immobilized or eliminated and the engine block 18 is not flipped. Otherwise the rotation of engine block 18 and movement down and off of the engine support bars 224 is identical to the movements described with respect to FIG. 14 for the transversely mounted engine block 18.

Although all of the embodiments are well-suited for automobiles, they are also applicable for use in other motor vehicles such as trucks, vans, or buses. Moreover, the present invention is also applicable to rear-engine driven vehicles, since it will be understood that when such vehicles are struck from the rear, the engine block 18 is similarly susceptible to invading the passenger compartment 34. In such an application, the engine mounting system 200 directs the rear-mounted engine block 18 forward and toward the ground in a direction away from the passenger compartment 34.

A variety of modifications and variations are possible in light of the above teachings without departing from the scope and spirit of the invention, which is limited only by the following claims.

What is claimed is:

1. An engine mounting system comprising:
   a first and a second engine support bar, each said engine support bar having an upper portion and a lower portion;
   an engine support wall movably engaged with said first and said second engine support bar to permit the engine support wall to move from said upper portion of each said engine support bar toward said lower portion; and
   an engine support plate and rotatably engaged with said engine support wall.

2. An engine mounting system comprising:
   a first and a second engine support bar, each said engine support bar having an upper portion and a lower portion;
   an engine support wall engaged with said first and said second engine support bar and movable therealong from said upper portion of each said engine support bar toward said lower portion;
   an engine support plate rotatably engaged with said engine support wall; and
   means for disengaging said engine support plate from said engine support wall when said engine support plate is rotated a predetermined amount with respect to said engine support wall.

3. An engine mounting system comprising:
   a first and a second engine support bar, each said engine support bar having an upper portion and a lower portion;
   an engine support wall engaged with said first and said second engine support bar and movable therealong from said upper portion of each said engine support bar toward said lower portion;
   an engine support plate rotatably engaged with said engine support wall; and
   mans for disengaging said engine support wall from said first and said second engine support bar when said engine support wall is moved a predetermined distance from said upper portion of each said engine support bar toward said lower portion.

4. The engine mounting system of claim 1, wherein said engine support plate is coupled to an engine block with a hinge.

5. An engine mounting system, capable of complex motion, for dissipating energy imparted to an engine after a vehicle crash, comprising:

an engine support plate having a first lug and a second lug;

a hinge attached to said engine support plate, said hinge coupled to an engine block for permitting said engine block to be rotated about said hinge;

an engine support wall having at least one track for accepting said first and said second lugs of said engine support plate, coupled to said engine support plate, said first and said second lugs retained by and movable within said at least one track; and a first and a second engine support bar, each said engine support bar having an upper end and a lower end, said upper end located within an engine compartment and coupled to said engine support wall through notches in said support wall.

6. The engine mounting system of claim 5, wherein said hinge comprises an axle disposed within an axle guide, said axle coupled to said engine block and said axle guide attached to said engine support plate.

7. The engine mounting system of claim 5, wherein said engine support wall has a front side, a back side, a top, a bottom, a left side, and a right side, and wherein said at least one track further comprises at least one opening along said bottom to permit at least one of said first and said second lugs to disengage from said support wall.

8. The engine mounting system of claim 7, wherein said at least one track is a single uninterrupted arcuate track open at either end and having an apex, said apex separating said first lug from said second lug under normal operating conditions, said arcuate track operative to force said first lug to move toward said apex when said second lug moves away from said apex and to force said second lug to move toward said apex when said first lug moves away from said apex.

9. The engine mounting system of claim 7, wherein said at least one track comprises a first track and a second track, each having a blocked upper end and an open lower end, for mating with said first lug and said second lug respectively, said upper ends separated by a greater distance than said lower ends.

10. The engine mounting system of claim 5, wherein said notches in said support wall comprise a first notch in said left side and a second notch in said right side, said first notch slidably engaged with said first engine support bar and said second notch slidably engaged with said second engine support bar.

11. The engine mounting system of claim 10, wherein said upper ends of said first and second engine support bars are separated by a distance corresponding to a distance between said first and said second notches so that said engine support wall is supported by said first and said second engine support bars.

12. The engine mounting system of claim 11, wherein said first and said second engine support bars curve downward from said upper ends to lower ends.

13. The engine mounting system of claim 12, wherein said lower ends of said first and said second engine support bars are separated by a distance greater than said distance separating said upper ends.

14. The engine mounting system of claim 13, wherein said first and said second notches disengage from said first and said second engine support bars respectively, when said engine support wall slides rearward and downward along said first and second engine support bars.

15. The engine mounting system of claim 5, wherein said engine block simultaneously rotates, moves downward, and moves rearward when said vehicle is subjected to a substantial impact having lateral and longitudinal components.

* * * * *